United States Patent [19]
Kalamkarov et al.

[11] Patent Number: 6,047,094
[45] Date of Patent: Apr. 4, 2000

[54] COMPOSITE CARRIER ASSEMBLY HAVING AN ENCAPSULATED SENSOR AND AN ASSOCIATED FABRICATION METHOD

[75] Inventors: Alexander L. Kalamkarov; Stephen Bruce Fitzgerald, both of Halifax, Canada

[73] Assignee: Dalhousie University, Nova Scotia, Canada

[21] Appl. No.: 09/088,665

[22] Filed: Jun. 2, 1998

[51] Int. Cl.[7] .................................................. G02B 6/00
[52] U.S. Cl. .............................. 385/12; 385/12; 385/13; 385/37
[58] Field of Search .................................. 385/12, 13, 37, 385/122, 126; 372/6, 96, 102

[56] References Cited

U.S. PATENT DOCUMENTS

| | | |
|---|---|---|
| 4,082,423 | 4/1978 | Glista et al. . |
| 4,634,217 | 1/1987 | Lefvacher et al. . |
| 4,840,452 | 6/1989 | Federmann et al. . |
| 4,841,778 | 6/1989 | Butler et al. . |
| 4,849,668 | 7/1989 | Crawley et al. . |
| 4,947,693 | 8/1990 | Szuchey et al. . |
| 4,996,884 | 3/1991 | Lessing . |
| 5,020,379 | 6/1991 | Berthold et al. . |
| 5,044,203 | 9/1991 | Wiest et al. . |
| 5,212,755 | 5/1993 | Holmberg . |
| 5,240,643 | 8/1993 | Buckley et al. . |
| 5,245,180 | 9/1993 | Sirkis . |
| 5,292,390 | 3/1994 | Burack et al. . |
| 5,305,507 | 4/1994 | Dvorskey et al. . |
| 5,320,788 | 6/1994 | Schneider et al. . |
| 5,360,497 | 11/1994 | Schneider et al. . |
| 5,399,854 | 3/1995 | Dunphey et al. . |
| 5,461,927 | 10/1995 | Bobb et al. . |
| 5,589,641 | 12/1996 | Johnson et al. . |
| 5,844,927 | 12/1998 | Kringlebotn ................ 385/12 X |

FOREIGN PATENT DOCUMENTS

| | | |
|---|---|---|
| 1290589 | 10/1991 | Canada . |
| 2051043 | 3/1993 | Canada . |
| 2105605 | 3/1995 | Canada . |
| 2169234 | 8/1996 | Canada . |
| 2009137 | 11/1996 | Canada . |

OTHER PUBLICATIONS

Czarnek et al, "Interferometric Measurements of Strain Concentrations Induced by an Optical Fiber Embedded in a Fiber Reinforced Composite," SPIE vol. 986, Fiber Optic Smart Structures and Skins, 1988, pp. 43–49.

(List continued on next page.)

*Primary Examiner*—Phan T. H. Palmer
*Attorney, Agent, or Firm*—Alston & Bird LLP

[57] ABSTRACT

A structure is provided that includes a structural element and a composite carrier assembly associated with the structural element, such as by being embedded therein, wherein the compatible carrier assembly includes a composite carrier and a sensor disposed with the composite carrier. By embedding the composite carrier assembly within a structural element, the sensor, such as a fiber optic sensor, will measure the conditions, such as the strain, temperature or the like, to which at least a portion of the structural element is subjected in a manner which averages the measurements over a distance greater than the predetermined dimensions of the sensor element. In addition, the thermal, mechanical and electrical characteristics of the composite carrier can be precisely tailored, such as to match those characteristics of the structural element in which the composite carrier is to be embedded, so that the composite carrier will be compatible with the host material of the structural element. The composite carrier also provides increased resistance to corrosion and a corresponding longer life for the encapsulated sensor than conventional techniques. A method is also provided for reliably fabricating a composite carrier assembly, including a curved or otherwise non-linear composite carrier assembly.

20 Claims, 2 Drawing Sheets

OTHER PUBLICATIONS

Measures et al, "Structurally Integrated Fiber Optic Damage Assessment System for Composite Materials," SPIE vol. 986, Fiber Optic Smart Structures and Skins, 1988, pp. 120–129.

Udd, "Overview of Fiber Optic Smart Structures for Aerospace Applications," SPIE vol. 986, Fiber Optic Smart Structures and Skins, 1988, pp. 2–5.

Rogowski et al, "Thermal Effects on Fiber Optic Strain Sensors Embedded in Graphite–Epoxy Resins," SPIE vol. 1170, Fiber Optic Smart Structures and Skins II, 1989, pp. 435–437.

Jensen and Pascual, "Degradation of Graphite/Bismaleimide Laminates with Multiple Embedded Fiber–Optic Sensors," SPIE vol. 1370, Fiber Optic Smart Structures and Skins III, 1990, pp. 228–237.

Talat, "Smart Skins and Fiber–Optic Sensors Application and Issues," SPIE vol. 1370, Fiber Optic Smart Structures and Skins III, pp. 103–114.

Friebele et al, Distributed Strain Sensing with Fiber Bragg Grating Arrays Embedded in CRTM Composites, SPIE vol. 2361, 2nd European Conference on Smart Structures and Materials, 1994, pp. 338–341.

Levin and Nilsson, "Analysis of the Local Stress Field in a Composite Material with an Embedded EFPI–Sensor, " SPIE vol. 2361, 2nd European Conference on Smart Structures and Materials, 1994, pp. 379–382.

Friebele et al, "Demonstration of Distributed Strain Sensing in Production Scale Instrumented Structures," Spie vol. 2721, 1996, pp. 118–124.

Kalamkarov et al, "Pultrusion of Smart FRP Composites," SPIE vol. 3042, 1997, pp. 440–409.

Kalamkarov et al, "Experimental Applications of Smart Composites," SPIE vol. 2921, 1997, pp. 410–418.

Krishnamoorthy and Belarbi, "Hybrid Composite Rebars for Smart Composite Structures," SPIE vol. 3043, Smart Systems for Bridges, Structures and Highways, 1997, pp. 65–69.

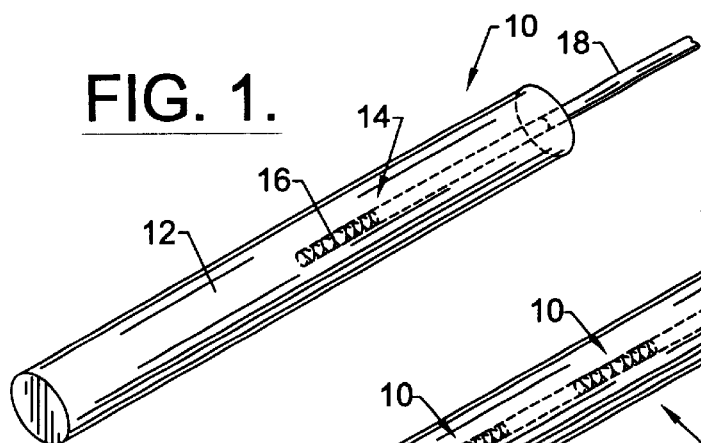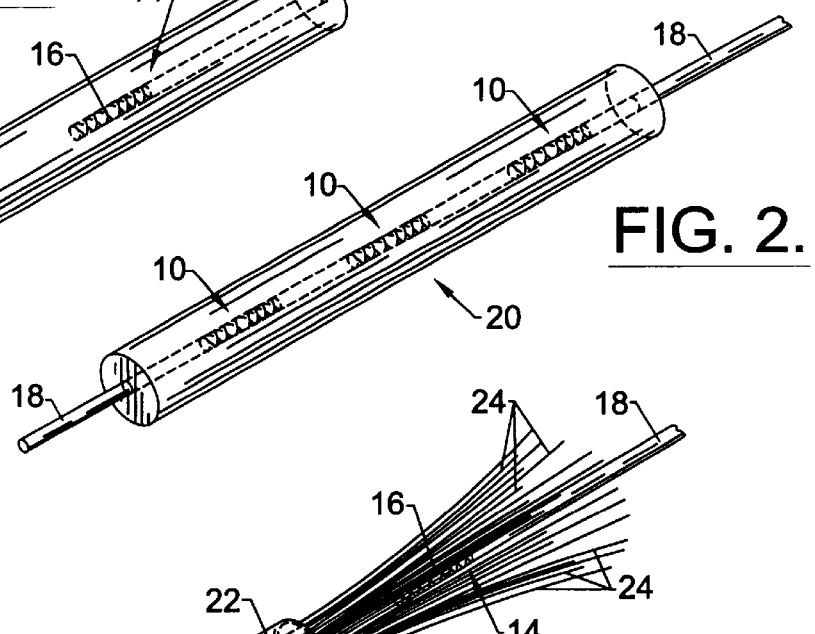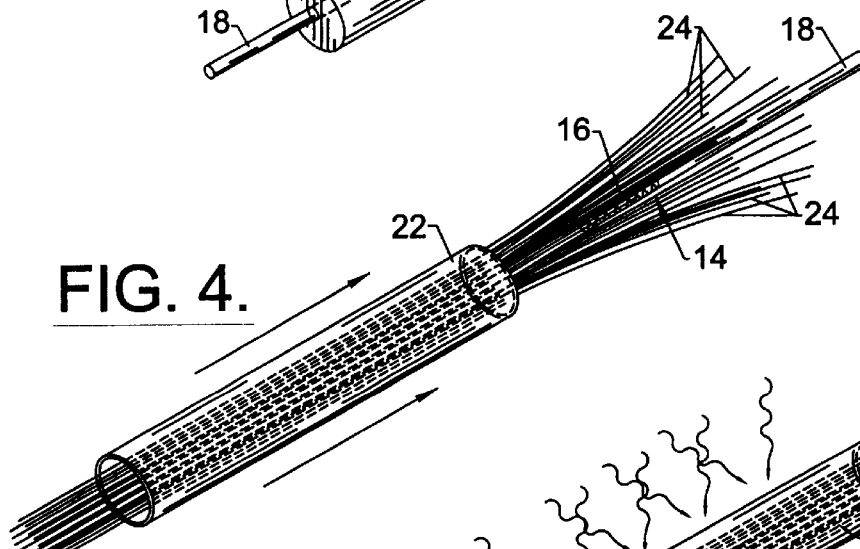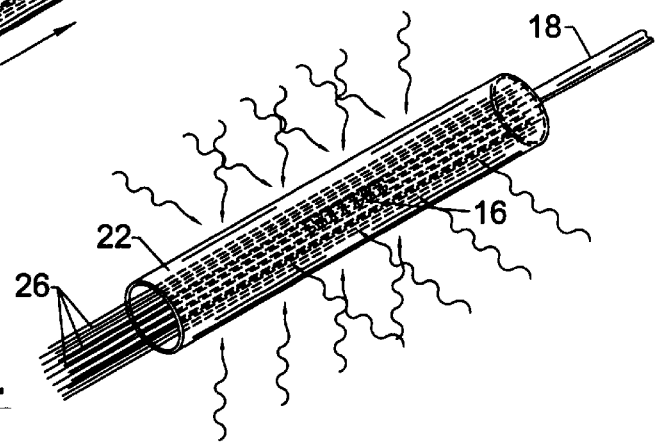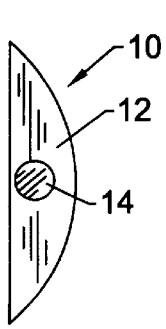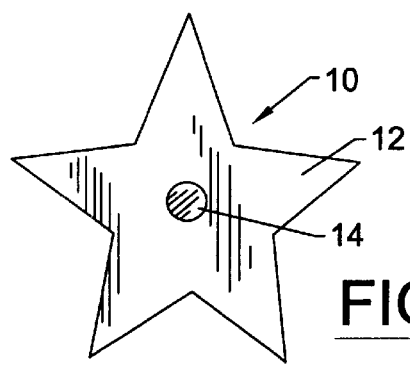

COMPOSITE CARRIER ASSEMBLY HAVING AN ENCAPSULATED SENSOR AND AN ASSOCIATED FABRICATION METHOD

FIELD OF THE INVENTION

The present invention relates generally to structures having sensors that are embedded or otherwise associated therewith as well as related methods for fabricating such structures.

BACKGROUND OF THE INVENTION

A variety of aerospace, civil and mechanical structures are typically instrumented with sensors, such as strain sensors, for measuring various forces or other physical phenomena to which the structure is subjected. For example, a number of steel and concrete structures, such as buildings, bridges, culverts, and tunnel linings, often include embedded strain sensors. In addition, while a variety of composite structures already incorporate strain sensors, the number of composite structures that will include sensors is expected to increase dramatically as composite structures are increasingly utilized in the aerospace, civil, construction, marine and transportation industries.

As known to those skilled in the art, the fabrication of composite structures generally subjects the composite structure to relatively high temperatures and relatively large pressures. An increasing number of composite structures are being pultruded so as to reduce the requisite manufacturing costs and time. As also known to those skilled in the art, a conventional pultrusion process wets the fibers with a resin prior to pulling the wet fibers through a heated die which subjects the wet fibers to relatively high temperatures and significant compressive forces. As such, sensors are particularly useful in conjunction with composite structures since the sensors will not only sense strain and other physical phenomena acting upon the composite structures following installation, but the sensors can also monitor strain and other physical phenomena imparted to the composite structures during the fabrication process. It is very advantageous to include sensors within pultruded composite structures so as to monitor the strain and other physical forces imparted to the composite structures during the pultrusion process and, in particular, during the curing of the resin within the heated die.

Traditionally, electronic sensors, such as electronic strain gauges, have been utilized to monitor the forces and other conditions, such as strain, to which an associated structure was subjected. In this regard, conventional electronic strain gauges include a resistive coating printed on a polymer substrate which is then attached to the structure, such that the resistance of the electronic strain gauge increases as the electronic strain gauge is stretched, thereby providing a measurement of the strain to which the associated structure is subjected.

In addition, piezoelectric sensors have also been embedded in structures, such as composite structures. As described by U.S. Pat. No. 5,305,507 to George R. Dvorsky, et al., a piezoelectric actuator or sensor can be encapsulated in a non-conductive fiber composite material formed of fiberglass cloth and a two-part epoxy. Once encapsulated, the actuator or sensor can be disposed within a composite structure. As described by the Dvorsky '507 patent, the actuator or sensor is encapsulated by covering the sensor or actuator with a fiberglass cloth and two-part epoxy and by placing the encapsulated sensor or actuator in a vacuum bag to extract unwanted air and excess resin. As such, the resulting shape of the encapsulated piezoelectric sensor or actuator is limited. That is, the encapsulated sensor would generally not be able to have an elongate rod-like shape, can only be formed into a planar or slightly curved shape in order to conform to the underlying structure and cannot have a number of other physical shapes that would be desirable for measurement purposes. In addition, the encapsulated piezoelectric sensor or actuator is generally relatively large in comparison to the subcomponent of the structure in which the piezoelectric sensor or actuator is embedded as well as in comparison to fiber optic and other types of sensors.

More recently, fiber optic sensors have been utilized to measure strain and other physical phenomena to which a structure is subjected. Fiber optic sensors are superior to comparable electronic sensors in a number of respects. As will be apparent, fiber optic sensors are much smaller than comparable electronic sensors. In addition, fiber optic sensors are less susceptible to electromagnetic interference, have improved corrosion resistance, reduced cabling requirements, have less physical influence on the overall structure, and generally improved measurement sensitivity.

However, fiber optic sensors also suffer from a number of shortcomings. For example, while the relatively small size of fiber optic sensors is advantageous in many respects, the small size makes fiber optic sensors relatively difficult to handle. In addition, fiber optic sensors provide an extremely localized measurement, such as a localized strain measurement. Unfortunately, engineers or other structural analysts oftentimes desire a measurement that has been averaged over a longer length or a larger area.

Additionally, fiber optic sensors are quite delicate. As such, the process for fabricating a carrier or other structure which includes a fiber optic sensor and/or the subsequent process of installing the carrier on or within a structure may damage the fiber optic sensor. Accordingly, at least some fiber optic sensors have been inserted into and bonded within a metal tube which is thereafter attached to or embedded within a structure, such as a concrete or composite structure. As such, the fiber optic sensor is somewhat protected by the metal tube from indelicate handling and forces present during the fabrication and installation processes that could otherwise be destructive.

In an attempt to enhance the mechanical bond between the sensor and the structure in which the sensor is embedded and to average the strain over the tube length, the metal tube generally has flared ends to create a dumbbell-like shape. Unfortunately, even dumbbell-shaped metal tubes are frequently relatively incompatible with the host material of the structure in which the sensor is embedded. For example, metal tubes oftentimes fail to form a secure bond with host material of the resulting structure. In addition, the coefficients of thermal expansion of the metal tube and the host material are also generally quite different such that the metal tube will expand and contract in different amounts than the host material as the temperature increases and decreases, respectively. Not only do the strains imposed upon a fiber optic sensor by the different coefficients of thermal expansion tend to adversely affect or alter the measurements provided by the sensor, but the differences in thermal expansion and contraction can destroy the bond, if any, between the host material and the metal tube and, consequently, between the host structure and the fiber optic sensor. Additionally, the metal tube is subject to corrosion when used in civil and concrete structures.

Thus, although a variety of structures, including steel, concrete and composite structures, incorporate sensors for measuring strain or other physical phenomena, these conventional structures still suffer from a number of deficiencies which could adversely affect the reliability and accuracy of the measurements provided by the sensors. As such, it would be desirable to be able to reliably embed and securely bond sensors, including fiber optic sensors, within a variety of structures such that the sensors are compatible with the host materials of the resulting structures. In addition, it would be desirable to provide a fiber optic sensor that is easier to handle, that is more resistant to abuse during installation, that is resistant to corrosion and other types of degradation, and that provides measurements that are averaged over a larger region than the dimensions of the actual sensor element of the fiber optic sensor.

SUMMARY OF THE INVENTION

According to the present invention, a structure is provided that includes a structural element and a composite carrier assembly associated with the structural element, such as by being embedded therein, wherein the compatible carrier assembly includes a composite carrier and a sensor, such as a fiber optic sensor, disposed with the composite carrier. According to one advantageous embodiment, the composite carrier assembly includes a fiber optic sensor having a sensor element with predetermined dimensions that is embedded within the composite carrier and an optical fiber having an end portion that extends beyond the composite carrier. By embedding the composite carrier assembly of this embodiment within a structural element, the fiber optic sensor measures a parameter that is dependent upon the conditions, such as the strain or temperature, to which at least a portion of the structural element is subjected in a manner which averages the measurements over a distance greater than the predetermined dimensions of the sensor element.

Advantageously, the composite carrier has predetermined dimensions that are greater than the predetermined dimensions of the sensor element such that the composite carrier assembly measures the parameter in a manner which averages the measurement over a distance that is between the respective predetermined dimensions of the composite carrier and the sensor element. For example, the composite carrier can be an elongate rod having a predetermined length and including a fiber optic strain gauge. As such, the composite carrier assembly of this exemplary embodiment measures the strain to which at least a portion of the structural element is subjected in a manner which averages the strain measurement over a distance that is between the respective predetermined lengths of the composite carrier and the sensor element.

Since the thermal, mechanical and electrical characteristics of the composite carrier can be precisely tailored, such as to match those characteristics of the structural element in which the composite carrier is to be embedded, the composite carrier of the present invention is compatible with the host material of the structural element. Thus, a secure bond can be formed between the host material of the structural element and the composite carrier, notwithstanding changes in temperature and other environmental conditions.

According to one advantageous embodiment, however, the composite carrier can define a lengthwise extending axis that is non-linear, and/or a lateral cross-sectional shape that is non-circular in order to facilitate even greater engagement of the composite carrier with the structural element in which the composite carrier assembly is embedded.

The resulting structure of the present invention can include a plurality of composite carrier assemblies disposed at respective positions within the structural element. The composite carrier assemblies of this embodiment are interconnected by leads, such as optical fibers, extending outward from respective ones to the sensors. As such, the parameter of interest can be measured at each of the plurality of positions at which the composite carrier assemblies are located.

According to another aspect of the present invention, a method for fabricating a composite carrier assembly is provided. The method of this aspect of the present invention positions a sensor within a plurality of fibers that are wet with resin. A fiber holder is then disposed about the wet fibers such that the wet fibers extend lengthwise through the fiber holder. In particular, the fiber holder is preferably disposed about the portion of wet fibers within which the sensor element is positioned. However, the end portion of the lead extends beyond the fiber holder. The resin is then cured while the fibers remain stationary within the fiber holder. Thereafter, the fiber holder can be removed to expose the resulting composite carrier assembly.

Preferably, the plurality of fibers includes a first section that is wet with resin and a second section that is dry. As such, the fiber holder is preferably first disposed about the second section of the dry fibers and is then moved lengthwise relative to the plurality of fibers from the second section of dry fibers to the first section of wet fibers once the sensor has been positioned within the plurality of wet fibers. In one advantageous embodiment, the fiber holder can be slid lengthwise over the plurality of fibers. Alternatively, the fibers can be pulled lengthwise through the fiber holder. In either embodiment, the dry fibers that extend beyond the fiber holder can then be removed, either before or after curing the resin within the fiber holder.

The fiber holder defines a predetermined lateral cross-sectional shape which defines the resulting lateral cross-sectional shape of the composite carrier assembly. After disposing the fiber holder about the wet fibers, however, the fiber holder can be further shaped or otherwise formed in a predetermined shape. For example, the fiber holder and the wet fibers disposed therein can be formed into a predetermined shape such that the lengthwise extending axis defined by the fiber holder is curved or otherwise non-linear. After curing, the resulting composite carrier assembly will retain the predetermined shape into which the fiber holder was formed. As such, composite carrier assemblies having predetermined shapes, such as predetermined curved shapes, can be readily formed so as to conform to structural elements having various shapes, for example, bridge piers and columns.

Accordingly, the composite carrier assembly of the present invention protects a sensor, such as a fiber optic sensor, during the process of attaching or embedding the composite carrier assembly within a structural element and thereafter installing the structural element. Additionally, the use of a carrier made of a composite material and its installation within a composite part for incorporation within an overall structure made of concrete, provides greatly enhanced corrosion resistance and long-term reliability. In addition, the composite carrier assembly permits measurements to be obtained that are averaged over a distance or dimensions greater than the length or dimensions of the sensor element of the fiber optic sensor. In addition, the composite carrier assembly can be designed to have thermal, electrical and mechanical properties that are tailored to match or otherwise conform to the properties of the host material of the structural element in which the composite carrier assembly will be embedded. As such, the composite carrier assembly will be compatible with the host material of the structural element and the embedded sensor will generate reliable measurements, even as the temperature and other conditions change. By using fiber, resins and particulates known to practitioners in this field, the mechanical and physical properties of the composite carrier assembly can be made anisotropic, thus providing a further method of tailoring the properties to the needs of the overall structure. Finally, the method of the present invention permits composite carrier assemblies to be readily fabricated including composite carrier assemblies having a curved or otherwise non-linear shape.

BRIEF DESCRIPTION OF THE DRAWINGS

FIG. 1 is a perspective view of a composite carrier assembly including an encapsulated sensor according to one advantageous embodiment of the present invention.

FIG. 2 is a perspective view of a rod-like structure according to one embodiment of the present invention that includes a plurality of spaced apart composite carrier assemblies.

FIG. 4 is a perspective view illustrating the placement of a sensor element within a number of fibers that are wet with resin.

FIG. 5 is a perspective view illustrating the relative movement of the fiber holder with respect to the plurality of fibers of FIG. 4 such that the fiber holder is disposed about the sensor element and a number of wet fibers.

FIGS. 7a and 7b are lateral cross-sectional views of two different embodiments of a composite carrier assembly according to the present invention which have non-circular lateral cross-sectional shapes.

DETAILED DESCRIPTION OF THE PREFERRED EMBODIMENTS

Figure 3:
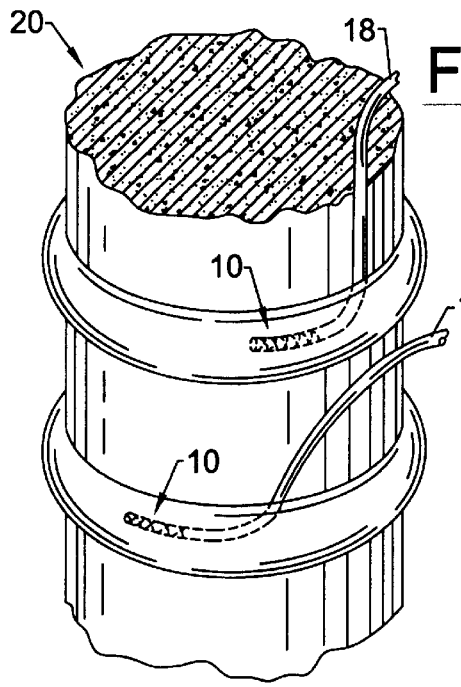
FIG. 3 is a fragmentary perspective view of a column having a composite wrap that includes a composite carrier assembly having a D-shaped lateral cross-sectional shape and a longitudinal curve according to one embodiment of the present invention.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, a composite carrier assembly 10 according to one embodiment of the present invention is illustrated. The composite carrier assembly includes a composite carrier 12 and a sensor 14 at least partially disposed within the composite carrier. Although a variety of sensors can be embedded within the composite carrier, the composite carrier assembly of the present invention is particularly useful in conjunction with fiber optic sensors, such as fiber optic strain sensors. As known to those skilled in the art, a fiber optic sensor, such as a fiber sensor strain sensor, generally includes a sensor element 16 and a lead 18, such as an optical fiber, that extends outwardly therefrom. For example, a conventional fiber optic strain sensor generally includes an optical fiber having either a sensor element defined by a number of gratings of a predetermined width and spacing (Bragg grating), or an air gap (Fabry-Perot).

As shown in FIG. 2, the composite carrier assembly 10 is associated with a structural element 20 to form a resulting structure. For example, the composite carrier assembly can be embedded within a structural element as shown in FIG. 2. Alternatively, a composite carrier assembly can be attached to the surface of the structural element. In either event, the composite carrier assembly protects the sensor 14 and facilitates the handling of the sensor during its attachment to or embedding within the structural element.

The structure of the present invention can include a variety of structural members 20 including reinforcing bars or prestressing tendons for bridges and other types of construction. In addition, the composite carrier can be shaped in lateral cross-section and/or longitudinal curvature to maximize bonding and to thereby increase measurement accuracy for such applications as measurement of circumferential strain in columns and bridge piers as shown in FIG. 3.

Depending upon its intended application, the structural element 20 can be formed of a variety of host materials. For example, the structural element can be formed of a metal, such as steel, concrete or any of a variety of composite materials. Advantageously, the composite carrier 12 can be designed such that the composite carrier assembly 10 is compatible with the host material of the structural element in which the composite carrier assembly is embedded or otherwise associated. For example, the composite carrier assembly can be designed by appropriately selecting the fibers and/or particulates and the resin which form the composite carrier such that the physical and/or mechanical properties, e.g., coefficient of thermal expansion, of the composite carrier matches the physical and/or mechanical properties of the host material. As such, the composite carrier assembly will expand and contract in like amounts to the host material of the structural element in which the composite carrier assembly is embedded or is otherwise associated. The composite carrier assembly will therefore remain securely bonded to the structural element. Additionally, the composite carrier assembly, including the embedded sensor 14, will not be subjected to additional strain or other detrimental forces generated by differences between the expansion and contraction of the composite carrier assembly and the structural element.

In addition, the fibers and/or particles and/or resin can be selected such that the coefficient of thermal expansion of the composite carrier 12 is anisotropic. As such, the composite carrier can be tailored to have different physical properties, e.g., different coefficients of thermal expansion, in the longitudinal direction as compared to the lateral direction.

As described in more detail below in conjunction with method aspects of the present invention, the composite carrier 12 is constructed of a plurality of fibers and/or particles embedded within a resin matrix. Depending upon the desired physical and mechanical properties, the fibers can be formed of a variety of materials including glass, carbon, graphite, aramid, boron metal, and the like. In addition, the typical resins include epoxy, vinyl ester, polyester, phenolic or thermoplastic polymers.

Although the sensor element 16 is greatly enlarged in FIGS. 1, 4 and 5 for purposes of illustration, the sensor element of a fiber optic sensor 14 is much smaller than the surrounding composite carrier 12. As described above, for example, a fiber optic sensor is typically formed by an optical fiber having a cross-sectional diameter of approximately 150 μm. In addition, the length of a fiber optic strain sensor, sometimes termed the gauge length, is generally of the order of 1 cm. In contrast, the composite carrier is much larger with the actual dimensions of the composite carrier depending upon its intended application. For purposes of example, however, a composite carrier generally has a length of between about 20 mm and 60 cm and a width of between about 0.5 mm and 5 cm. In any event, the length of the composite carrier is preferably about 10 times greater than the cross-sectional diameter of the sensor element.

Since the composite carrier 12 has dimensions that are greater than the dimensions of the sensor element 10, the composite carrier assembly 10 of the present invention measures the strain or other conditions to which a portion of the structural element 20 is subjected in a manner which averages the measurement over a distance greater than the predetermined dimensions of the sensor element 16. In particular, the composite carrier assembly measures the strain or other conditions to which at least a portion of the structural element is subjected in a manner which averages the measurement over a distance that is between the predetermined dimensions of the composite carrier and the predetermined dimensions of the sensor element. As shown in FIG. 1, the composite carrier of one advantageous embodiment is a elongate rod having a predetermined length. As such, the resulting composite carrier assembly measures the strain or other conditions to which at least a portion of the structural element is subjected in a manner that averages the measurement over a distance that is between the respective predetermined lengths of the composite carrier and the sensor element.

As illustrated in FIG. 1 and as described above, a sensor 14, such as a fiber optic strain sensor, includes a sensor element 16 and an optical fiber 18 that extends beyond the composite carrier 12. As shown in FIG. 2, a structure of one embodiment of the present invention can include a plurality of composite carrier assemblies that are interconnected via the optical fibers that extend outwardly from respective one of the composite carriers. Since the sensor element of each fiber optic sensor is generally designed to reflect a different wavelength of light, the plurality of fiber optic sensors can be simultaneously monitored by discriminating between the various wavelengths of the reflected light to determine the desired parameter, such as strain, temperature or the like, at each of the respective positions at which the composite carrier assemblies are located.

As shown in FIG. 1, the composite carrier 12 of one advantageous embodiment is an elongate rod defining a lengthwise extending axis and having a generally circular lateral cross-sectional shape. According to another embodiment illustrated in lateral cross-section in FIGS. 7a and 7b, the composite carrier can have a lateral cross-sectional shape which is non-circular. For example, the cross-sectional shape of the composite carrier illustrated in FIG. 7a is generally D-shaped. Although a composite carrier assembly 10 having a D-shaped composite carrier can be used in a variety of applications, a composite carrier assembly having a D-shaped composite carrier is particularly suited for attachment to the outside of structures such as columns as shown in FIG. 3. In addition, the lateral cross-sectional shape of the composite carrier in FIG. 7b is generally star-shaped. Even though tailoring the physical and mechanical characteristics of the composite carrier to match the physical and mechanical characteristics of the host material provides a composite carrier assembly which establishes a secure bond with the host material, a composite carrier which defines a non-circular lateral cross-sectional shape engages the host material of the structural element 20 so as to even further secure the mechanical bond therebetween.

According to the present invention, a method for fabricating a composite carrier assembly 10 is also provided. As shown in FIG. 4, a sensor 14 is initially positioned at least partially within a plurality of fibers that are wet with resin. In particular, the sensor includes a sensor element 16 disposed within the wet fibers and a lead 18, such as an optical fiber, that extends outward beyond the wet fibers. As shown in FIG. 5, a fiber holder 22 is thereafter disposed about at least a portion of the wet fibers such that the wet fibers extend lengthwise through the fiber holder. As also shown in FIG. 5, the fiber holder is preferably disposed about the wet fibers such that the sensor element is positioned within the fiber holder and at least an end portion of the lead, such as an end portion of the optical fiber, extends beyond the fiber holder.

In addition to the first section 24 of fibers that is wet with resin, the plurality of fibers also preferably includes a second section 26 that is dry. As such, the fiber holder 22 is preferably initially disposed about the second section of dry fibers as shown in FIG. 4 and is thereafter moved lengthwise relative to the plurality of fibers from the second section of dry fibers to the first section of wet fibers as indicated by the rightwardly pointed arrow in FIG. 5. According to one advantageous embodiment, the fiber holder is moved lengthwise relative to the plurality of fibers by sliding the fiber holder lengthwise over the plurality of fibers from the second section of dry fibers to the first section of wet fibers. Alternatively, the plurality of fibers can be pulled lengthwise through the fiber holder so as to move the fiber holder lengthwise relative to the plurality of fibers.

Once the fiber holder 22 is disposed about the wet fibers, the resin is cured, such as by heating the fiber holder, while the fibers remain stationary within the fiber holder. Once the resin has cured, the fiber holder is removed, such as by slitting the fiber holder in a lengthwise direction and thereafter peeling the fiber holder from the cured composite carrier 12.

After disposing the fiber holder 22 about the wet fibers, the dry fibers that extend beyond the fiber holder are preferably removed, such as by cutting the dry fibers near the end of the fiber holder. The dry fibers can be removed at any one of several stages of the fabrication process. For example, the dry fibers can be removed either before or after curing the resin and either before or after removing the fiber holder. Once the dry fibers and the fiber holder have been removed, the composite carrier assembly 10 shown in FIG. 1 is produced.

While the fiber holder 22 can be formed of a variety of materials, the fiber holder is preferably formed of a material which only slightly adheres, if at all, to the resin such that the fiber holder can be moved relative to the plurality of fibers and such that the fiber holder can be removed from the cured composite carrier 12. The fiber holder of one advantageous embodiment is therefore formed of silicone. Alternatively, the fiber holder can be formed of a polymer, glass or metal.

In addition to tailoring the thermal, mechanical and electrical properties of the composite carrier 12, the geometry or shape of the composite carrier can be tailored for particular applications. For example, the composite carrier of the present invention can be fabricated to have a curved or other non-linear shape. In this regard, a fiber holder 22 is provided that defines a lengthwise extending axis and a predefined lateral cross-sectional shape. The fiber holder preferably retains its lateral cross-sectional shape throughout the fabrication process such that the initial lateral cross-sectional shape of the fiber holder will define the lateral cross-sectional shape of the resulting composite carrier assembly 10. However, once the fiber holder has been disposed about the wet fibers but prior to curing the resin, the fiber holder can be molded or otherwise shaped into a predetermined shape, such that the longitudinal axis of the fiber holder is curved or otherwise non-linear. As such, the fiber holder can be molded into a predetermined curved or other non-linear shape.

Figure 6A:
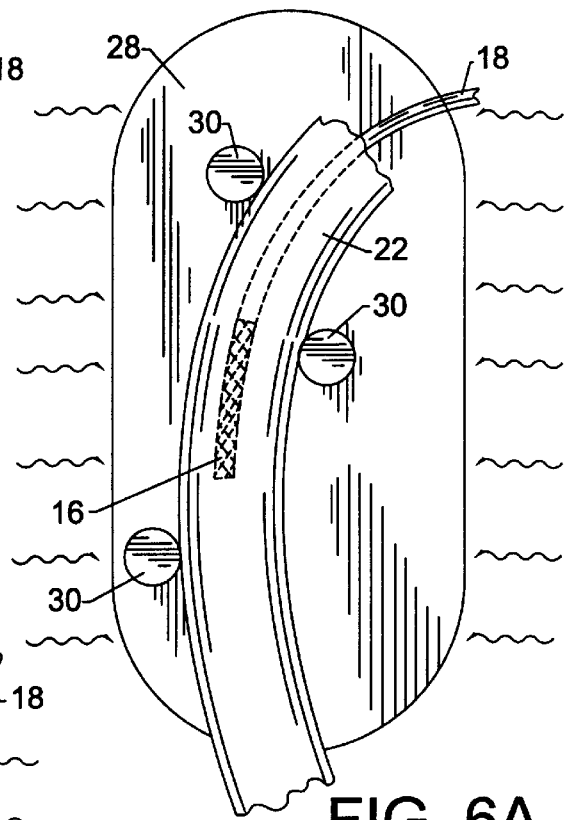
FIGS. 6a and 6b illustrate two alternative techniques for forming a composite carrier assembly of the present invention into a curved shape prior to curing of the resin.
Figure 6B:
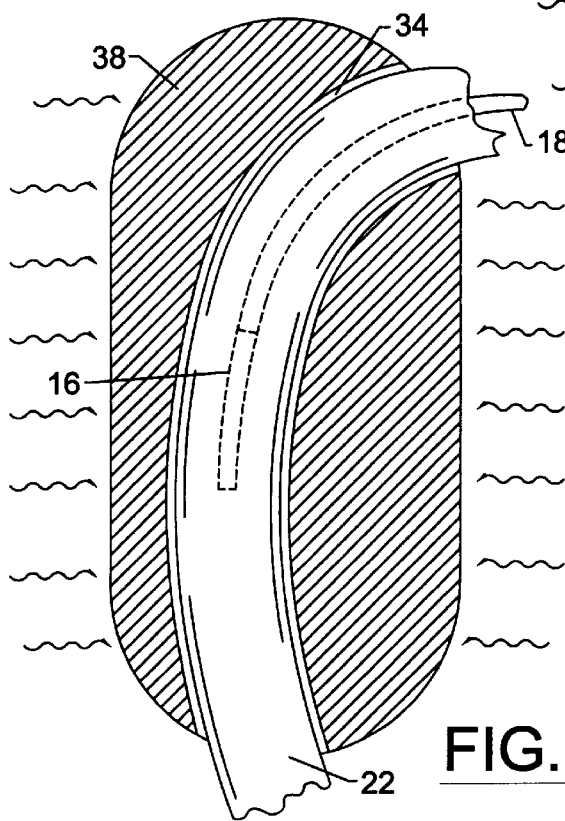

For example, FIGS. 6A and 6B illustrate two techniques of shaping a fiber holder 22 into a curved shape. In both techniques, once the composite carrier and the sensor 14 have been disposed within the fiber holder, the fiber holder is mounted in a former. In FIG. 6A, the former is a board or flat surface 28 with vertical pegs 30 at suitable positions to hold the fiber holder in a curved shape during curing. In FIG. 6B, the former is a housing 32 defining a groove or slot 34 of a predefined shape. In both cases, the geometry or shape of the resulting composite carrier assembly can be specifically tailored to meet the demands of the particular application in which the composite carrier assembly is to be utilized.

Accordingly, the composite carrier assembly 10 of the present invention protects a sensor 14, such as a fiber optic sensor, during the process of embedding the composite carrier assembly within a structural element 20 and thereafter installing the structural element. In addition, the composite carrier assembly permits measurements to be obtained that are averaged over a distance or dimensions greater than the length or dimensions of the sensor element 16. In addition, the composite carrier assembly can be designed to have thermal, electrical and mechanical properties that are tailored to match or otherwise conform to the properties of the host material of the structural element in which the composite carrier assembly will be embedded. As such, the composite carrier assembly will be compatible with the host material of the structural element and the embedded sensor will generate reliable measurements, even as the temperature and other conditions change. Also, the use of a composite carrier and fiber optic sensor greatly increases corrosion resistance, hence long-term reliability, when used in environmentally harsh and corrosive environments. Finally, the method of the present invention permits composite carrier assemblies to be readily fabricated including composite carrier assemblies having a curved or otherwise non-linear shape for greater mechanical compatibility and more accurate measurement in the eventual deployment.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A structure having an associated fiber optic sensor, the structure comprising:

a composite carrier comprised of resin and a component that is selected from the group consisting of fibers and particles;

a fiber optic sensor disposed within said composite carrier to thereby form a composite carrier assembly, said fiber optic sensor comprising a sensor element embedded within said composite carrier and an optical fiber having an end portion that extends beyond said composite carrier, said sensor element having predetermined dimensions and being adapted to measure a predetermined parameter; and a structural element, wherein said composite carrier assembly is associated within said structural element so as to measure the predetermined parameter in a manner which averages the predetermined parameter over a distance greater than the predetermined dimensions of said sensor element.

2. A structure according to claim 1 wherein said composite carrier has predetermined dimensions that are greater than the predetermined dimensions of said sensor element such that said composite carrier assembly measures the predetermined parameter in a manner which averages the predetermined parameter over a distance that is between the respective predetermined dimensions of said composite carrier and said sensor element.

3. A structure according to claim 2 wherein said composite carrier is an elongate rod having a predetermined length, wherein said sensor element has a predetermined length, and wherein said composite carrier assembly measures the predetermined parameter in a manner which averages the predetermined parameter over a distance that is between the respective predetermined lengths of said composite carrier and said sensor element.

4. A structure according to claim 3 wherein said fiber optic sensor has a predetermined cross-sectional diameter, and wherein the predetermined length of said composite carrier is at least ten times greater than the predetermined cross-sectional diameter of said fiber optic sensor.

5. A structure according to claim 1 wherein said composite carrier has physical properties that are anisotropic.

6. A structure according to claim 1 wherein said composite carrier has a lengthwise extending axis, and wherein said composite carrier is shaped such that the lengthwise extending axis is non-linear.

7. A structure according to claim 1 wherein said composite carrier defines a lengthwise extending axis and a lateral cross-sectional shape that is non-circular for further engaging said structural element with which said composite carrier assembly is associated.

8. A structure according to claim 1 further comprising a plurality of composite carrier assemblies associated within said structural element at a plurality of respective positions, wherein said composite carrier assemblies are interconnected by the optical fibers of respective ones of said fiber optic sensors such that the predetermined parameter is measured at the plurality of respective positions at which said composite carrier assemblies are located.

9. A method for fabricating a composite carrier assembly comprising the steps of:

positioning a sensor within a plurality of fibers that are wet with resin, wherein the sensor comprises a sensor element and a lead that extends outwardly therefrom;

disposing a fiber holder about at least a portion of the wet fibers such that the wet fibers extend lengthwise through the fiber holder, wherein said disposing step comprises disposing the fiber holder about the portion of the wet fibers within which the sensor element is positioned such that an end portion of the lead extends beyond the fiber holder;

curing the resin while the fibers remain stationary within the fiber holder; and removing the fiber holder to expose the resulting composite carrier assembly.

10. A method according to claim 9 wherein the plurality of fibers includes a first section that is wet with resin and a second section that is dry, and wherein said disposing step comprises the steps of:

disposing the fiber holder about the second section of dry fibers; and moving the fiber holder lengthwise relative to the plurality of fibers from the second section of dry fibers to the first section of wet fibers once the sensor has been positioned within the plurality of wet fibers.

11. A method according to claim 10 wherein said moving step comprises sliding the fiber holder lengthwise over the plurality of fibers from the second section of dry fibers to the first section of wet fibers.

12. A method according to claim 10 wherein said moving step comprises pulling the plurality of fibers lengthwise through the fiber holder.

13. A method according to claim 10 further comprising the step of removing the second section of dry fibers that extend beyond the fiber holder.

14. A method according to claim 9 further comprising the step of shaping the fiber holder into a predetermined curved shape between said disposing and said curing steps such that the resulting composite carrier assembly retains the predetermined curved shape.

15. A method according to claim 9 wherein the fiber holder defines a lengthwise extending axis and a lateral cross-sectional shape, and wherein said disposing step comprises shaping the portion of the wet fibers to have the lateral cross-sectional shape defined by the fiber holder.

16. A method according to claim 15 wherein the lateral cross-sectional shape of the fiber holder is non-circular, and wherein said shaping step comprises shaping the portion of the wet fibers to have the non-circular shape defined by the lateral cross-sectional shape of the fiber holder.

17. A composite carrier assembly fabricated according to a method comprising the steps of:

providing a fiber holder defining an elongate cavity having a lengthwise extending axis;

positioning a fiber optic sensor within a plurality of fibers that are wet with resin, wherein the fiber optic sensor comprises a sensor element and an optical fiber;

disposing at least a portion of the wet fibers within the fiber holder such that the wet fibers extend lengthwise through the elongate cavity defined by the fiber holder, wherein said disposing step comprises disposing the portion of the wet fibers within which the sensor element is positioned within the elongate cavity defined by the fiber holder such that an end portion of the optical fiber extends beyond the elongate cavity;

forming the fiber holder and the wet fibers disposed therein into a predetermined shape such that the lengthwise extending axis of the fiber holder is nonlinear; and removing the fiber holder once the resin has cured to form a composite carrier to thereby expose the resulting composite carrier assembly having the predetermined nonlinear shape and including the sensor element embedded within the composite carrier and the optical fiber having the end portion that extends outwardly from the composite carrier.

18. A composite carrier assembly according to claim 17 wherein the plurality of fibers includes a first section that is wet with resin and a second section that is dry, wherein said providing step comprises providing an elongate fiber holder, and wherein said disposing step comprises the steps of:

disposing the fiber holder about the second section of dry fibers; and moving the fiber holder lengthwise relative to the plurality of fibers from the second section of dry fibers to the first section of wet fibers once the fiber optic sensor has been positioned within the plurality of wet fibers.

19. A method according to claim 18 further comprising the step of removing the second section of dry fibers that extend beyond the fiber holder.

20. A composite carrier assembly according to claim 17 wherein said providing step comprises providing an elongate fiber holder defining a lateral cross-sectional shape that is non-circular, and wherein said disposing step comprises shaping the portion of the wet fibers to have the non-circular lateral cross-sectional shape defined by the fiber holder.

* * * * *